(12) United States Patent
Yoshizaki et al.

(10) Patent No.: US 11,300,040 B2
(45) Date of Patent: Apr. 12, 2022

(54) CONTROLLER AND CONTROL METHOD FOR INTERNAL COMBUSTION ENGINE

(71) Applicant: TOYOTA JIDOSHA KABUSHIKI KAISHA, Aichi-ken (JP)

(72) Inventors: Satoshi Yoshizaki, Gotenba (JP); Masayuki Hisada, Toyota (JP); Masahiro Noguchi, Handa (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 17/111,512

(22) Filed: Dec. 4, 2020

(65) Prior Publication Data

US 2021/0189947 A1 Jun. 24, 2021

(30) Foreign Application Priority Data

Dec. 20, 2019 (JP) .............................. JP2019-230212

(51) Int. Cl.
*F02B 37/00* (2006.01)
*F02M 35/10* (2006.01)
*F02B 37/16* (2006.01)
*F02D 9/02* (2006.01)
*F02M 35/104* (2006.01)

(52) U.S. Cl.
CPC ............ *F02B 37/001* (2013.01); *F02B 37/16* (2013.01); *F02D 9/02* (2013.01); *F02M 35/104* (2013.01); *F02M 35/10157* (2013.01)

(58) Field of Classification Search
CPC .......... F02B 37/001; F02B 37/16; F02D 9/02; F02D 41/0007; F02M 35/10157; F02M 35/104

USPC ................. 60/600, 605.1, 611, 612; 123/562
See application file for complete search history.

(56) References Cited

U.S. PATENT DOCUMENTS

| 5,186,005 | A * | 2/1993 | Yoshioka | F02B 37/007 60/612 |
| 6,263,673 | B1 * | 7/2001 | Schmidt | F02B 37/007 60/612 |
| 6,338,250 | B1 * | 1/2002 | Mackay | F02B 37/007 60/612 |

(Continued)

FOREIGN PATENT DOCUMENTS

| JP | 2015209789 A | 11/2015 |
| JP | 201689804 A | 5/2016 |

*Primary Examiner* — Thai Ba Trieu
(74) *Attorney, Agent, or Firm* — Hauptman Ham, LLP

(57) ABSTRACT

A controller for an internal combustion engine includes an intake air amount obtaining unit, an open-closed determination unit, and an air bypass valve control unit. The intake air amount obtaining unit is configured to obtain, using a target torque of the internal combustion engine, a target throttle passage amount as a target value of an amount of intake air drawn through a throttle valve. The open-closed determination unit is configured to determine whether a valve opening condition for first and second air bypass valves is satisfied. The air bypass valve control unit is configured to open the first and second air bypass valves when the valve opening condition is satisfied. The open-closed determination unit is configured to determine that the valve opening condition is satisfied when a decrease speed of the target throttle passage amount is greater than a specified determination speed.

7 Claims, 4 Drawing Sheets

(56) References Cited

U.S. PATENT DOCUMENTS

| | | | |
|---|---|---|---|
| 7,380,401 B2* | 6/2008 | Henn | F02B 37/16 60/611 |
| 9,915,193 B2* | 3/2018 | Casal Kulzer | F02B 37/001 |
| 10,100,753 B2* | 10/2018 | Saito | F02B 37/001 |
| 10,711,687 B2* | 7/2020 | Yoshizaki | F02B 37/001 |
| 10,738,686 B2* | 8/2020 | Matsumoto | F02B 37/16 |
| 10,934,929 B2* | 3/2021 | Yoshizaki | F02D 41/0007 |
| 2015/0308358 A1 | 10/2015 | Matsumoto et al. | |

* cited by examiner

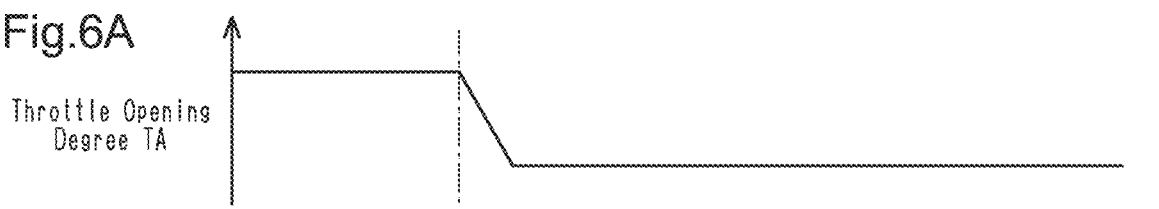
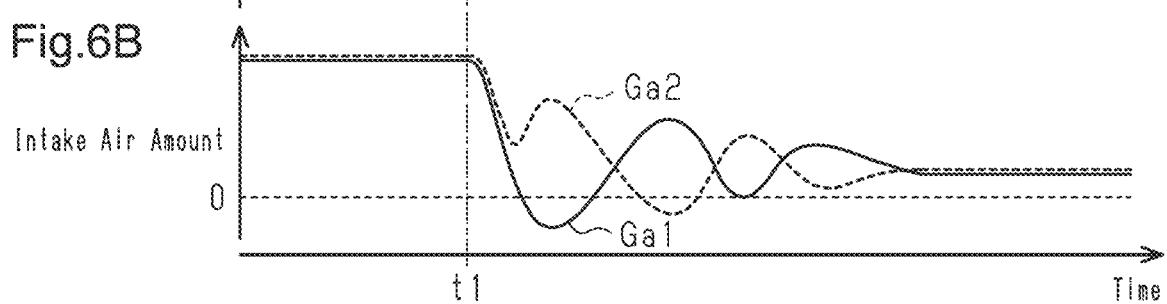
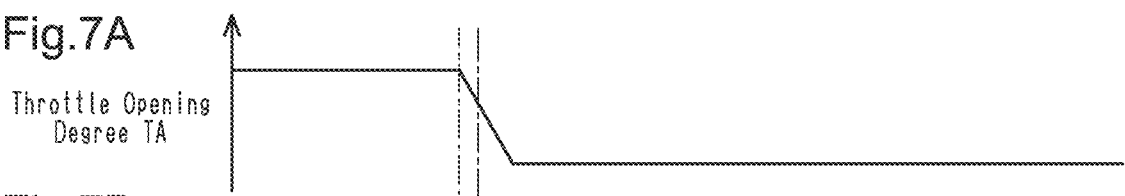
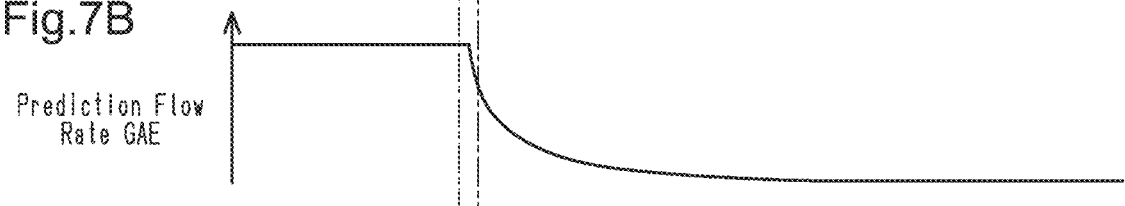
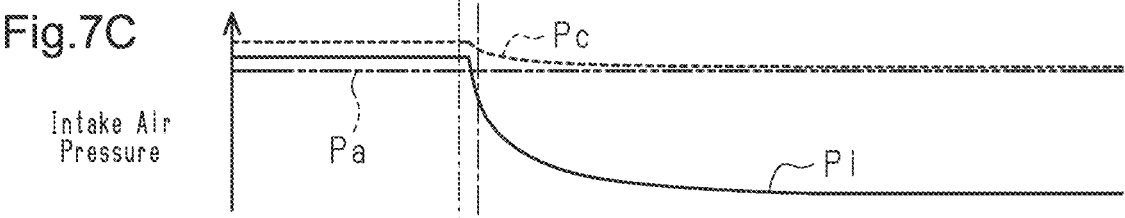
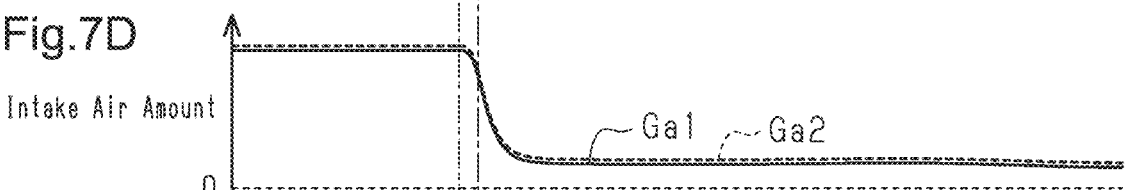
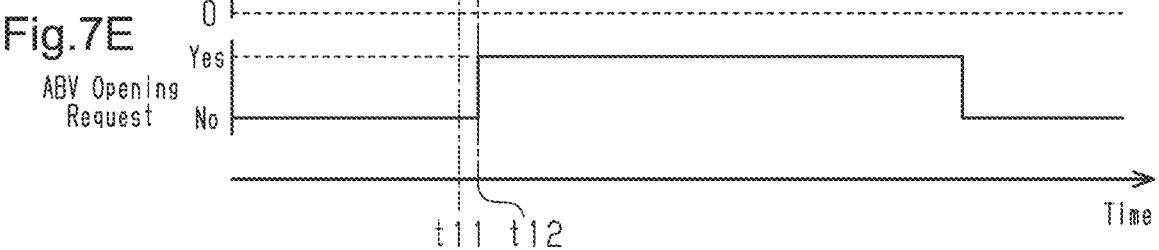

CONTROLLER AND CONTROL METHOD FOR INTERNAL COMBUSTION ENGINE

RELATED APPLICATIONS

The present application claims priority of Japanese Application Number 2019-230212, filed on Dec. 20, 2019, the disclosure of which is hereby incorporated by reference herein in its entirety.

BACKGROUND

1. Field

The present disclosure relates to a controller and a control method for an internal combustion engine with a forced induction device.

2. Description of Related Art

Japanese Laid-Open Patent Publication No. 2015-209789 discloses an internal combustion engine in which the compressors of two forced induction devices are arranged in parallel. This internal combustion engine is provided with an intake passage such that the intake air that has passed through one of the compressors merges with the intake air that has passed through the other compressor and then the merged intake air is drawn into each of the cylinders. A throttle valve is arranged downstream of the merge point of the intake air in the intake passage. Further, each of the two compressors is provided with an air bypass valve. Specifically, the air bypass valves are arranged on bypasses that connect the upstream portion and the downstream portion of the compressors in the intake passage.

The controller disclosed in the above-described document executes a control that opens the air bypass valves when the running condition of the internal combustion engine is in a surge occurrence region in order to prevent the occurrence of surging, in which the intake air that has passed through the compressors flow backward into the compressors. The surge occurrence region is determined using a pressure ratio, which is the ratio of boost pressure to atmospheric pressure, and the amount of air passing through the throttle valve.

In the above-described internal combustion engine, when the throttle valve is closed, the intake air that has passed through the compressors has no place to flow to. Thus, the intake air that has been compressed by one of the compressors to flow toward the throttle valve may flow back toward the other compressor. In this case, the intake air flows from the compressor with a high rotation speed to the compressor with a low rotation speed. The compressor on the upstream side of the backward flow pushes the intake air toward the compressor on the downstream side so that the upstream compressor has a lower rotation speed than the downstream compressor. As a result of the decrease in the rotation speed of the upstream compressor, the backflow direction of the intake air reverses when the compressor with the highest rotation speed switches between the upstream compressor and the downstream compressor. The backflow of the intake air may reverse repeatedly until the rotation speed of each compressor decreases as the backflow of the intake air becomes weak.

In the following description, the repetition of the backflow of intake air between one of the compressors and the other compressor is referred to as an alternating backflow. During the occurrence of the alternating backflow, for example, the detection value of an air flow meter may deviate from the value of an actual intake air amount. Such an alternating backflow occurs in a region with a small pressure ratio and/or a region with a small amount of air passing through the throttle valve, not when the stream of the intake air that would cause surging is strong. If the air bypass valves are open, the intake air that has passed through the compressors is released and thus the alternating backflow is prevented. However, in the above-described controller, when the pressure ratio is small and the amount of air passing through the throttle valve is small, the running condition is out of the surge occurrence region. Accordingly, the air bypass valves are not opened.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A controller for an internal combustion engine according to an aspect is configured to control the internal combustion engine. The internal combustion engine includes a first forced induction device including a first compressor arranged on a first intake passage, a second forced induction device including a second compressor arranged on a second intake passage, a merge portion where intake air that has passed through the first compressor in the first intake passage merges with intake air that has passed through the second compressor in the second intake passage, an intake manifold through which intake air is drawn into a cylinder in the first and second intake passages, a merged intake air passage connecting the merge portion and the intake manifold in the first and second intake passages, a throttle valve arranged on the merged intake air passage, a first bypass connecting a portion upstream of the first compressor in the first intake passage and a portion downstream of the first compressor in the first intake passage, a second bypass connecting a portion upstream of the second compressor in the second intake passage and a portion downstream of the second compressor in the second intake passage, a first a bypass valve arranged on the first bypass, and a second air bypass valve arranged on the second bypass. The controller includes an intake air amount obtaining unit configured to obtain, using a target torque of the internal combustion engine, a target throttle passage amount as a target value of an amount of intake air drawn through the throttle valve, an open-closed determination unit configured to determine whether a valve opening condition for the first and second air bypass valves is satisfied, and an air bypass valve control unit configured to open the first and second air bypass valves when the valve opening condition is satisfied. The open-closed determination unit is configured to determine that the valve opening condition is satisfied when a decrease speed of the target throttle passage amount is greater than a specified determination speed.

In the above-described configuration, when the decrease speed of the target throttle passage amount is high, that is, when the target throttle passage amount is abruptly decreasing, the throttle valve is likely to be closed. With the above-described configuration, when the intake air that has passed through the first compressor and the second compressor is likely to have no place to flow to due to the closing of the throttle valve, the first and second air bypass valves are opened regardless of the magnitude of the pressure ratio or the target throttle passage amount. Thus, even when the pressure ratio or the target throttle passage amount is small, the intake air can be released through the first bypass and the second bypass by opening the first and second air bypass valves. This prevents the occurrence of alternate backflow, which occurs because the intake air having no place to flow to flows from the compressor with a higher rotation speed to the compressor with a lower rotation speed.

An example of the controller further includes a pressure ratio obtaining unit configured to obtain a ratio of a boost pressure to an internal pressure as a pressure ratio, the internal pressure being a pressure in a portion upstream of the first compressor or a portion upstream of the second compressor in the first intake passage, the boost pressure being a pressure in a portion between the first compressor and the throttle valve in the first intake passage and a pressure in a portion between the second compressor and the throttle valve in the second intake passage. The open-closed determination unit is configured to execute a first process that determines whether the valve opening condition is satisfied and a second process that determines, with the valve opening condition referred to as a first valve opening condition, whether a second valve opening condition for the first and second air bypass valves is satisfied. The open-closed determination unit is configured to determine, in the second process, that the second valve opening condition is satisfied when occurrence of surging is predicted from a relationship between the pressure ratio and the target throttle passage amount, the air bypass valve control unit is configured to open the first and second air bypass valves when at least one of the first valve opening condition or the second valve opening condition is satisfied, and the open-closed determination unit is configured to determine that the first valve opening condition is satisfied on condition that the pressure ratio is less than or equal to a specified determination pressure ratio.

In the above-described configuration, the first valve opening condition and the second valve opening condition are set as a condition of opening the first and second air bypass valves. When the pressure ratio is small, surging does not occur easily and alternate backflow occurs easily. The first valve opening condition is determined as being satisfied when the decrease speed of the target throttle passage amount is high and the pressure ratio is small. This allows the first and second air bypass valves to be opened when alternate backflow is predicted to occur. In this manner, by determining that the first valve opening condition is satisfied only when the pressure ratio is small, the running condition in which the first and second air bypass valves open as a result of the first process is limited more accurately to a running condition in which alternate backflow occurs, and the first and second air bypass valves are prevented from being unnecessarily opened.

An example of the controller further includes a throttle state determination unit configured to determine an open-closed state of the throttle valve. The open-closed determination unit is configured to determine, in the first process, that the first valve opening condition is satisfied on condition that the throttle valve is determined as being closed.

For example, the throttle state determination unit may be configured to determine that the throttle valve is closed when a pressure in the intake manifold is less than a specified determination pressure.

With the above-described configuration, determining the open-closed state of the throttle valve increases the accuracy of determining whether the alternate backflow is predicted to occur. That is, by further limiting the running condition in which the first and second air bypass valves are opened as a result of the first process, the first and second air bypass valves are prevented from being unnecessarily opened.

In an example of the controller, the open-closed determination unit is configured to determine, in the first process, that the first valve opening condition is satisfied on condition that the target throttle passage amount is less than or equal to a specified determination threshold value.

When the prediction flow rate is great, even if the decrease speed of the target throttle passage amount is high, enough time enough to completely close the throttle valve may be given. That is, it is predicted that alternate backflow does not occur immediately when the target throttle passage amount is large. With the above-described configuration, since the first valve opening condition is determined as being satisfied only when the target throttle passage amount is small, the accuracy of determining whether the alternate backflow is predicted to occur is increased. By further limiting the running condition in which the first and second air bypass valves are opened as a result of the first process, the first and second air bypass valves are prevented from being unnecessarily opened.

A control method for an internal combustion engine according to another aspect is provided. The internal combustion engine includes a first forced induction device including a first compressor arranged on a first intake passage, a second forced induction device including a second compressor arranged on a second intake passage, a merge portion where intake air that has passed through the first compressor in the first intake passage merges with intake air that has passed through the second compressor in the second intake passage, an intake manifold through which intake air is drawn into a cylinder in the first and second intake passages, a merged intake air passage connecting the merge portion and the intake manifold in the first and second intake passages, a throttle valve arranged on the merged intake air passage, a first bypass connecting a portion upstream of the first compressor in the first intake passage and a portion downstream of the first compressor in the first intake passage, a second bypass connecting a portion upstream of the second compressor in the second intake passage and a portion downstream of the second compressor in the second intake passage, a first air bypass valve arranged on the first bypass, and a second air bypass valve arranged on the second bypass. The method includes obtaining, using a target torque of the internal combustion engine, a target throttle passage amount as a target value of an amount of intake air drawn through the throttle valve, determining whether a valve opening condition for the first and second air bypass valves is satisfied, opening the first and second air bypass valves when the valve opening condition is satisfied, and determining that the valve opening condition is satisfied when a decrease speed of the target throttle passage amount is greater than a specified determination speed.

A controller for an internal combustion engine according to an aspect is configured to control the internal combustion engine. The internal combustion engine includes a first forced induction device including a first compressor arranged on a first intake passage, a second forced induction device including a second compressor arranged on a second intake passage, a merge portion where intake air that has passed through the first compressor in the first intake passage merges with intake air that has passed through the second compressor in the second intake passage, an intake manifold through which intake air is drawn into a cylinder in the first and second intake passages, a merged intake air passage connecting the merge portion and the intake manifold in the first and second intake passages, a throttle valve arranged on the merged intake air passage, a first bypass connecting a portion upstream of the first compressor in the first intake passage and a portion downstream of the first compressor in the first intake passage, a second bypass connecting a portion upstream of the second compressor in the second intake passage and a portion downstream of the second compressor in the second intake passage, a first air bypass valve arranged on the first bypass, a second air bypass valve arranged on the second bypass, and a processor. The processor is configured to obtain, using a target torque of the internal combustion engine, a target throttle passage amount as a target value of an amount of intake air drawn through the throttle valve, determine whether a valve opening condition for the first and second air bypass valves is satisfied, open the first and second air bypass valves when the valve opening condition is satisfied, and determine that the valve opening condition is satisfied when a decrease speed of the target throttle passage amount is greater than a specified determination speed.

Other features and aspects will be apparent from the following detailed description, the drawings, and the claims.

BRIEF DESCRIPTION OF THE DRAWINGS

FIGS. 6A and 6B are timing diagrams each showing a state where the alternating backflow occurs as a comparative example.

FIGS. 7A to 7E are timing diagrams each showing a state of the internal combustion engine controlled by the controller.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

A controller 10 for an internal combustion engine 20 according to an embodiment will now be described with reference to FIGS. 1 to 7E.

Figure 1:
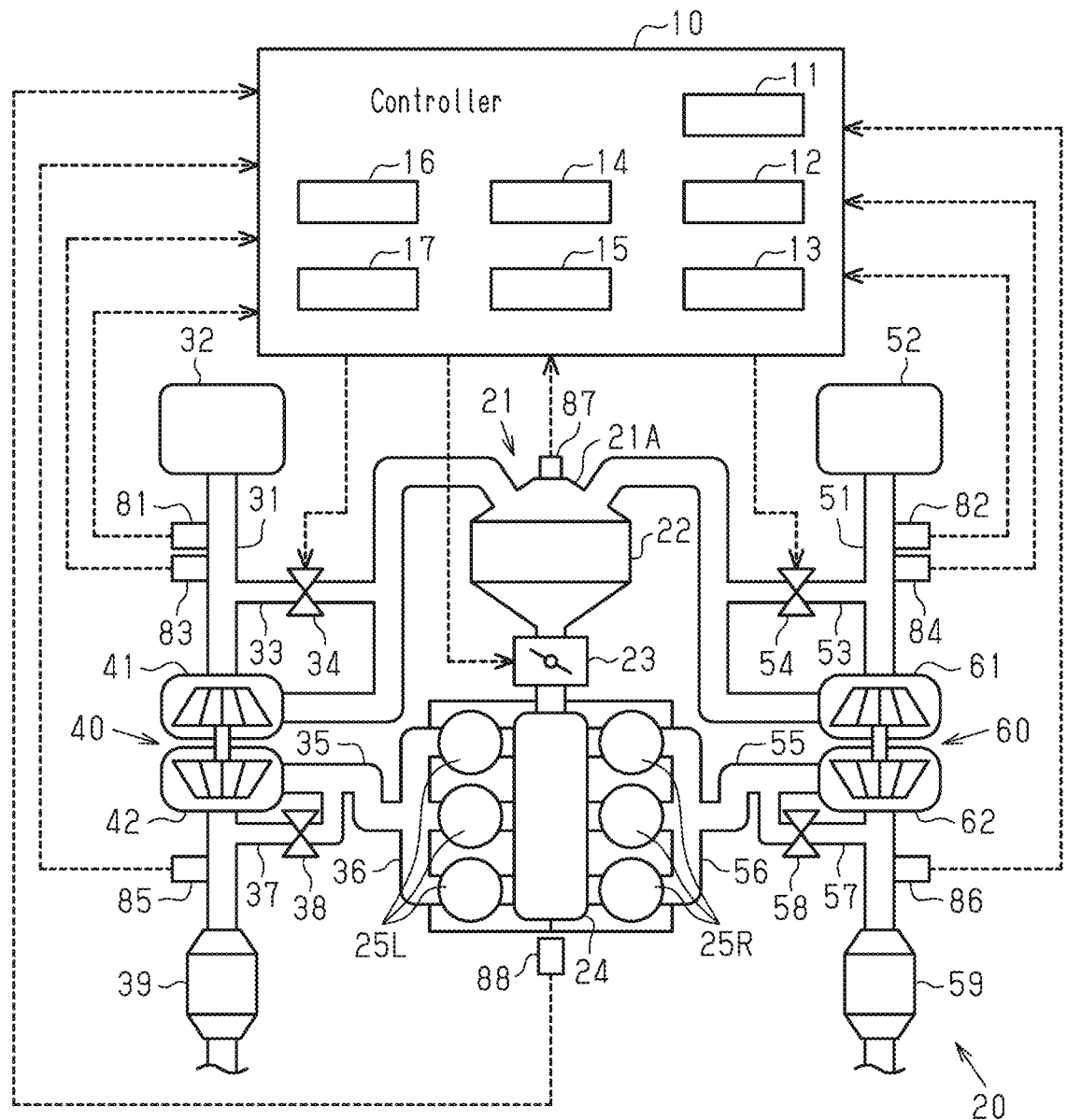
FIG. 1 is a schematic diagram showing a controller for an internal combustion engine according to an embodiment and the internal combustion engine controlled by the controller.

FIG. 1 schematically shows the internal combustion engine 20 and the controller 10 of the internal combustion engine 20.

The internal combustion engine 20 includes two forced induction devices of exhaust turbine type, namely, a first forced induction device 40 and a second forced induction device 60. The first forced induction device 40 and the second forced induction device 60 are arranged in parallel.

The first forced induction device 40 includes a first compressor 41. The first compressor 41 is arranged on a first intake passage 31. External air is drawn into the first intake passage 31 through a first air cleaner 32. A first air flow meter 81 and a first internal pressure sensor 83 are arranged upstream of the first compressor 41 in the first intake passage 31. The first air flow meter 81 detects the amount of intake air that passes through the first intake passage 31. The first internal pressure sensor 83 detects the pressure in a portion upstream of the first compressor 41.

The first intake passage 31 is provided with a first bypass 33, which connects the upstream portion and the downstream portion of the first compressor 41 and bypasses the first compressor 41. The first bypass 33 is provided with a first air bypass valve 34, which regulates the flow rate of air that passes through the first bypass 33. When the first air bypass valve 34 is open, some of the intake air bypasses the first compressor 41 in correspondence with the opening degree of the first air bypass valve 34 and flows through the first bypass 33 into the upstream portion of the first compressor 41 in the first intake passage 31.

The second forced induction device 60 includes a second compressor 61. The second compressor 61 is arranged on a second intake passage 51. A second air flow meter 82 and a second internal pressure sensor 84 are arranged upstream of the second compressor 61 in the second intake passage 51. The second air flow meter 82 detects the amount of intake air that passes through the second intake passage 51. The second internal pressure sensor 84 detects the pressure in a portion upstream of the second compressor 61.

The second intake passage 51 is provided with a second bypass 53, which connects the upstream portion and the downstream portion of the second compressor 61 and bypasses the second compressor 61. The second bypass 53 is provided with a second air bypass valve 54, which regulates the flow rate of air that passes through the second bypass 53. When the second air bypass valve 54 is open, some of the intake air bypasses the second compressor 61 in correspondence with the opening degree of the second air bypass valve 54 and flows through the second bypass 53 into the upstream portion of the second compressor 61 in the second intake passage 51.

The internal combustion engine 20 includes a merge portion 21A, where the intake air that has passed through the first compressor 41 in the first intake passage 31 merges with the intake air that has passed through the second compressor 61 in the second intake passage 51. The merge portion 21A connects a portion downstream of the downstream connection part of the first bypass 33 in the first intake passage 31 to a portion downstream of the downstream connection part of the second bypass 53 in the second intake passage 51.

The internal combustion engine 20 includes a merged intake air passage 21, which connects the merge portion 21A and the intake manifold 24. The merged intake air passage 21 is provided with an intercooler 22 and a throttle valve 23 in this order from the merged intake air passage 21 toward the intake manifold 24.

The intake manifold 24 is connected to the cylinder block of the internal combustion engine 20. In the internal combustion engine 20, the cylinder block includes six cylinders. The intake air that has passed through the throttle valve 23 is drawn through the intake manifold 24 into each cylinder of the internal combustion engine 20. The intake manifold 24 is provided with a manifold pressure sensor 88, which detects the pressure in the intake manifold 24.

In FIG. 1, three cylinders located at the left of the intake manifold 24 are referred to as a first cylinder group 25L. Three cylinders located at the right of the intake manifold 24 are referred to as a second cylinder group 25R.

The internal combustion engine 20 includes a first exhaust passage 35, through which the exhaust gas discharged out of the first cylinder group 25L passes. The exhaust gas discharged out of the first cylinder group 25L gathers through a first exhaust manifold 36, which is connected to the cylinder block, and flows into the first exhaust passage 35.

The first exhaust passage 35 is provided with a first turbine 42 of the first forced induction device 40. The first exhaust passage 35 is provided with a first wastegate 37, which connects the upstream portion and the downstream portion of the first turbine 42 and bypasses the first turbine 42. The first wastegate 37 is provided with an electronically-controlled first wastegate valve 38. The first wastegate valve 38 is selectively opened and closed in order to control the boost pressure.

A first air-fuel ratio sensor 85, which is capable of detecting the air-fuel ratio of exhaust gas passing through the first exhaust passage 35, is attached to the downstream portion of the first turbine 42 in the first exhaust passage 35. A first catalyst 39 is arranged downstream of the first air-fuel ratio sensor 85 in the first exhaust passage 35.

The internal combustion engine 20 includes a second exhaust passage 55, through which the exhaust gas discharged out of the second cylinder group 25R passes. The exhaust gas discharged out of the second cylinder group 25R gathers through a second exhaust manifold 56, which is connected to the cylinder block, and flows into the second exhaust passage 55.

The second exhaust passage 55 is provided with a second turbine 62 of the second forced induction device 60. The second exhaust passage 55 is provided with a second wastegate 57, which connects the upstream portion and the downstream portion of the second turbine 62 and bypasses the second turbine 62. The second wastegate 57 is provided with an electronically-controlled second wastegate valve 58. The second wastegate valve 58 is selectively opened and closed in order to control the boost pressure.

A second air-fuel ratio sensor 86, which is capable of detecting the air-fuel ratio of exhaust gas passing through the second exhaust passage 55, is attached to the downstream portion of the second turbine 62 in the second exhaust passage 55. A second catalyst 59 is arranged downstream of the second air-fuel ratio sensor 86 in the second exhaust passage 55.

In the following description, the first air bypass valve 34 is referred to as a first ABV 34 and the second air bypass valve 54 is referred to as a second ABV 54. The first and second ABVs 34, 54 are normally-closed valves. As described later, the first and second ABVs 34, 54 are opened by an air bypass valve control unit (ABV control unit) 11 of the controller 10.

The controller 10 includes, as functional units, the ABV control unit 11, an open-closed determination unit 12, a request output unit 13, a detection unit 14, a prediction flow rate obtaining unit 15, a throttle state determination unit 16, and a pressure ratio obtaining unit 17. The controller 10 simply needs to have any one of the following configurations (a) to (c).

(a) The controller 10 includes one or more processors that execute various processes in accordance with a computer program. The processor includes a CPU and a memory such as a RAM and ROM. The memory stores program codes or instructions configured to cause the CPU to execute the processes. The memories, or computer readable media, include any type of media that are accessible by general-purpose computers and dedicated computers. (b) The controller 10 includes one or more dedicated hardware circuits that execute various processes. The dedicated hardware circuits include, for example, an application specific integrated circuit (ASIC) or a field programmable gate array (FPGA). (c) The controller 10 includes a processor that executes part of various processes in accordance with a computer program and a dedicated hardware circuit that executes the remaining processes.

The controller 10 receives detection signals from the various sensors of the internal combustion engine 20.

The detection unit 14 is configured to obtain a detection value used to control the internal combustion engine 20 in reference to the detection signals from the various sensors of the internal combustion engine 20.

For example, the detection unit 14 uses a detection signal from the first air flow meter 81 to obtain a first intake air amount Ga1, which is the amount of intake air that flows from the first air cleaner 32 and passes through the first intake passage 31. The detection unit 14 uses a detection signal from the second air flow meter 82 to obtain a second intake air amount Ga2, which is the amount of intake air that flows from the second air cleaner 52 and passes through the second intake passage 51.

The detection unit 14 uses a detection signal from the first internal pressure sensor 83 or the second internal pressure sensor 84 to obtain an internal pressure Pa. The internal pressure Pa is obtained as the pressure in the portion upstream of the first compressor 41 in the first intake passage 31 and as the pressure in the portion upstream of the second compressor 61 in the second intake passage 51. The portion of the first intake passage 31 where the first internal pressure sensor 83 is arranged is closer to the first air cleaner 32 than to the first compressor 41. That is, the portion where the first internal pressure sensor 83 is arranged is opened, and thus the pressure detected by the first internal pressure sensor 83 is close to the atmospheric pressure. In the same manner, the portion where the second internal pressure sensor 84 is arranged is opened, and thus the pressure detected by the second internal pressure sensor 84 is close to the atmospheric pressure. Accordingly, the difference is negligible between a detection value based on the detection signal from the first internal pressure sensor 83 and a detection value based on the detection signal from the second internal pressure sensor 84. Thus, in the present embodiment, the internal pressure Pa detected in reference to the detection signal from the first internal pressure sensor 83 and the detection signal from the second internal pressure sensor 84 is used as the pressure in the portion upstream of the first compressor 41 and the pressure in the portion upstream of the second compressor 61.

The detection unit 14 uses a detection signal from a boost pressure sensor 87 to obtain a boost pressure Pc, which is the pressure in the portions downstream of the first compressor 41 and the second compressor 61.

The detection unit 14 uses a detection signal from the manifold pressure sensor 88 to obtain an intake manifold pressure Pi, which is the pressure in the intake manifold 24.

The detection unit 14 uses a detection signal from the first air-fuel ratio sensor 85 to obtain a first exhaust gas air-fuel ratio Af1 as the air-fuel ratio of exhaust gas passing through the first exhaust passage 35. The detection unit 14 uses a detection signal from the second air-fuel ratio sensor 86 to obtain a second exhaust gas air-fuel ratio Af2 as the air-fuel ratio of exhaust gas passing through the second exhaust passage 55.

The prediction flow rate obtaining unit 15 is configured to obtain, using a target torque of the internal combustion engine 20, a target throttle passage amount GAT as a target value of the amount of intake air drawn into the intake manifold 24 through the throttle valve 23. The prediction flow rate obtaining unit 15 corresponds to an intake air amount obtaining unit that obtains the target throttle passage amount. The target torque of the internal combustion engine 20 is obtained using, for example, the operation amount of the accelerator pedal in a vehicle equipped with the internal combustion engine 20.

The prediction flow rate obtaining unit 15 is further configured to obtain a first prediction flow rate using the target throttle passage amount GAT, which is the target value of the amount of intake air passing through the throttle valve 23 on the merged intake air passage 21. The first prediction flow rate is obtained as a prediction value of the amount of intake air passing through the first compressor 41, which is located upstream of the merge portion 21A. The first prediction flow rate is obtained using the target throttle passage amount GAT in view of, for example, the length, cross-sectional area, and extending shape of the first intake passage 31. Also, the prediction flow rate obtaining unit 15 is configured to obtain, using the target throttle passage amount GAT, a second prediction flow rate as a prediction value of the amount of intake air passing through the second compressor 61. The second prediction flow rate is obtained using the target throttle passage amount GAT in view of, for example, the length, cross-sectional area, and extending shape of the second intake passage 51.

In the present embodiment, the first prediction flow rate is used as a prediction flow rate GAE to control the first and second ABVs 34, 54.

The prediction flow rate obtaining unit 15 time-differentiates the prediction flow rate GAE to obtain, as a decrease speed DGAE, a speed at which the prediction flow rate GAE decreases.

The throttle state determination unit 16 is configured to determine an open-closed state of the throttle valve 23 using the intake manifold pressure Pi. When the intake manifold pressure Pi obtained as the pressure in the intake manifold 24 is low, it is predicted that the pressure in the intake manifold 24 has decreased due to the closing of the throttle valve 23. The throttle state determination unit 16 is configured to determine that the throttle valve 23 is closed when the intake manifold pressure Pi is less than a determination manifold pressure Pith.

The pressure ratio obtaining unit 17 is configured to obtain, using the internal pressure Pa and the boost pressure Pc, the ratio of the boost pressure Pc to the internal pressure Pa as a pressure ratio PR. As the boost pressure Pc increases, the value of the pressure ratio PR increases. When the first compressor 41 and the second compressor 61 do not perform supercharging, the pressure ratio PR is close to 1.0.

The open-closed determination unit 12 is configured to execute a surging prevention process and an alternating backflow prevention process as a process that switches the first and second ABVs 34, 54 to be open or closed. The details of the surging prevention process and the alternating backflow prevention process will be described later.

The open-closed determination unit 12 is further configured to execute a valve closing determination process, which determines whether a valve closing condition for the first and second ABVs 34, 54 is satisfied. In the valve closing determination process, the open-closed determination unit 12 determines that the valve closing condition is satisfied when, for example, the vehicle equipped with the internal combustion engine 20 is requested to be accelerated. Examples of the request of accelerating the vehicle include a request of fully opening the throttle valve 23 and a request of increasing the target torque.

The request output unit 13 is configured to output, using the result of the surging prevention process or the alternating backflow prevention process executed by the open-closed determination unit 12, an ABV opening request when a valve opening condition for the first and second ABVs 34, 54 is satisfied. The details of the process that outputs the ABV opening request will be described later. The request output unit 13 uses the result of the valve closing determination process executed by the open-closed determination unit 12 to output an ABV closing request when the valve closing condition for the first and second ABVs 34, 54 is satisfied.

The ABV control unit 11 is configured to control the first and second ABVs 34, 54 using the ABV opening request or the ABV closing request output from the request output unit 13. When the ABV opening request is output from the request output unit 13, the ABV control unit 11 opens the first and second ABVs 34, 54. In a case where the output of the ABV opening request is stopped when the ABV control unit 11 is opening the first and second ABVs 34, 54, the first and second ABVs 34, 54 are closed.

Further, when the ABV closing request is output from the request output unit 13, the ABV control unit 11 closes the first and second ABVs 34, 54.

The surging prevention process executed by the open-closed determination unit 12 will now be described with reference to FIGS. 2 and 3.

Figure 2:
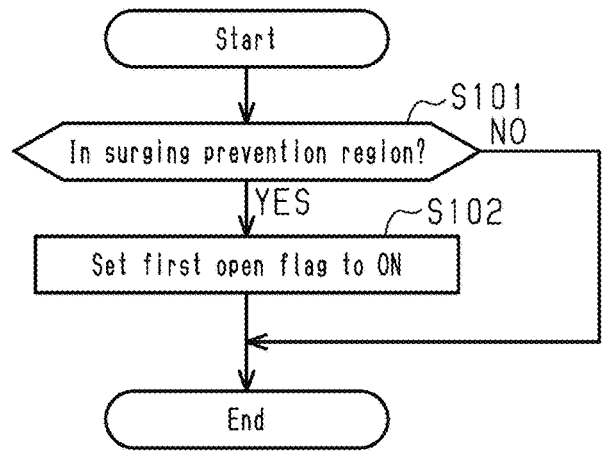
FIG. 2 is a flowchart illustrating the flow of a single process related to the control of the air bypass valve executed by the open-closed determination unit of the controller.

The processing routine of the surging prevention process in FIG. 2 determines whether the running condition of the internal combustion engine 20 is in a surging prevention region.

The surging prevention region will now be described with reference to FIG. 3. The open-closed determination unit 12 stores the relationship between the pressure ratio PR, the prediction flow rate GAE, and the surging prevention region. Referring to FIG. 3, the running condition in which the occurrence of surging is predicted from the relationship between the pressure ratio PR and the prediction flow rate GAE is set as the surging prevention region. The surging prevention region has been obtained in advance using the results of, for examples, experiments.

Figure 3:
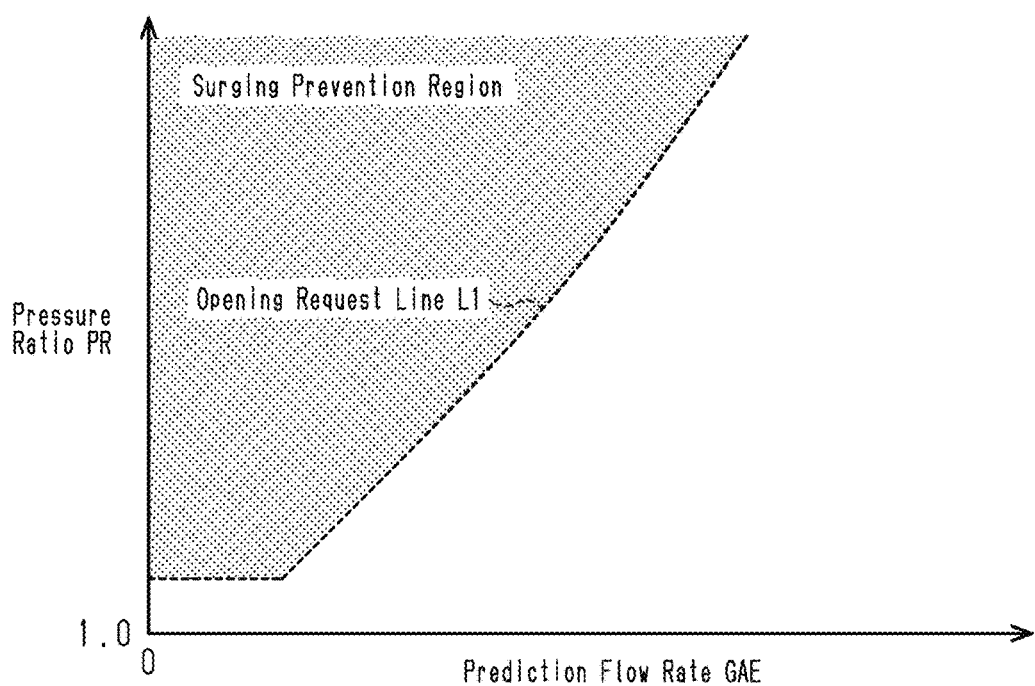
FIG. 3 is a graph illustrating the relationship of the control of the air bypass valve with the running condition of the internal combustion engine.

FIG. 3 shows an opening request line L1, which connects the lower limit value of the pressure ratio PR relative to the prediction flow rate GAE in the surging prevention region. In a range of the opening request line L1 where the prediction flow rate GAE is small, the pressure ratio PR corresponding to the prediction flow rate GAE is limited to a fixed value. In a range where the prediction flow rate GAE is greater than the prediction flow rate GAE in the range where the pressure ratio PR is limited to the fixed value, the opening request line L1 indicates a relationship in which the pressure ratio PR corresponding to the prediction flow rate GAE increases as the prediction flow rate GAE increases. FIG. 3 shows a region where the prediction flow rate GAE is greater than or equal to 0 and the pressure ratio PR is greater than or equal to 1.0.

Limiting the pressure ratio PR corresponding to the prediction flow rate GAE to the fixed value in the range of the opening request line L1 where the prediction flow rate GAE is small is an example of setting the surging prevention region. In this range, the opening request line L1 may be set such that the pressure ratio PR increases as the prediction flow rate GAE increases. However, in the range where the pressure ratio PR is small, the pressure ratio PR tends to change greatly due to a slight fluctuation of the boost pressure Pc. Thus, it is difficult to bring the opening request line L1 close to a region where the pressure ratio PR is 1.0 in order to ensure the accuracy of determining the running condition of the internal combustion engine 20. Accordingly, even when the pressure ratio PR is not limited to the fixed value, it is preferred that the opening request line L1 be separated from the region where the pressure ratio PR is 1.0.

The processing routine of the surging prevention process executed by the open-closed determination unit 12 will now be described with reference to FIG. 2. The present processing routine is repeatedly executed in predetermined cycles.

When the present processing routine is executed, the open-closed determination unit 12 first determines in step S101 whether the running condition of the internal combustion engine 20 is in the surging prevention region. When changes in the prediction flow rate GAE and the pressure ratio PR cause the running condition of the internal combustion engine 20 to exceed the opening request line L1 shown in FIG. 3 and enter the surging prevention region, the open-closed determination unit 12 determines that the running condition of the internal combustion engine 20 is in the surging prevention region.

When the running condition of the internal combustion engine 20 is in the surging prevention region (S101: YES), the open-closed determination unit 12 advances the process to step S102. In step S102, the open-closed determination unit 12 sets a first opening flag F1 to ON. Then, the open-closed determination unit 12 ends the present processing routine. When the first opening flag F1 is ON, the first opening flag F1 indicates that a request for opening the first and second ABVs 34, 54 has been determined as being issued by the surging prevention process. Thus, when the first opening flag F1 is ON, the request output unit 13 outputs the ABV opening request.

In the process of step S101, when the running condition of the internal combustion engine 20 is not in the surging prevention region (S101: NO), the open-closed determination unit 12 ends the present processing routine.

The surging prevention process corresponds to a second process that determines that a second valve opening condition is satisfied when the occurrence of surging is predicted from the relationship between the pressure ratio and the target throttle passage amount. The second valve opening condition includes a condition in which the running condition of the internal combustion engine 20 is in the surging prevention region.

The processing routine of the alternating backflow prevention process executed by the open-closed determination unit 12 will now be described with reference to FIG. 4. The present processing routine is repeatedly executed in predetermined cycles.

When the present processing routine is executed, the open-closed determination unit 12 first determines in step S201 whether the decrease speed DGAE is greater than a determination speed DGAEth. When the prediction flow rate GAE is abruptly decreasing, that is, when the decrease speed DGAE is great, the throttle valve 23 is highly likely to be closed. The determination speed DGAEth is set as a specified threshold value used to determine that the prediction flow rate GAE is abruptly decreasing. When the decrease speed DGAE is greater than the determination speed DGAEth (S201: YES), the open-closed determination unit 12 advances the process to step S202.

In step S202, the open-closed determination unit 12 determines whether the throttle is closed. That is, when the throttle state determination unit 16 determines that the throttle valve 23 is closed (S202: YES), the open-closed determination unit 12 advances the process to step S203.

In step S203, the open-closed determination unit 12 determines whether the prediction flow rate GAE is less than or equal to a determination flow rate GAEth. The determination flow rate GAEth is set as the value of the prediction flow rate GAE in a range smaller than the opening request line L1 shown in FIG. 3. Thus, when the prediction flow rate GAE is less than or equal to the determination flow rate GAEth, the running condition of the internal combustion engine 20 is out of the surging prevention region. When the prediction flow rate GAE is less than or equal to the determination flow rate GAEth (S203: YES), the open-closed determination unit 12 advances the process to step S204.

In step S204, the open-closed determination unit 12 determines whether the pressure ratio PR is less than or equal to a determination pressure ratio PRth. The determination pressure ratio PRth is set as the value of the pressure ratio PR in the range smaller than the opening request line L1 shown in FIG. 3. Thus, when the pressure ratio PR is less than or equal to the determination pressure ratio PRth, the running condition of the internal combustion engine 20 is out of the surging prevention region. When the pressure ratio PR is less than or equal to the determination pressure ratio PRth (S204: YES), the open-closed determination unit 12 advances the process to step S205. In step S205, the open-closed determination unit 12 sets a second opening flag F2 to ON. Then, the open-closed determination unit 12 ends the present processing routine. When the second opening flag F2 is ON, the second opening flag F2 indicates that a request for opening the first and second ABVs 34, 54 has been determined as being issued by the surging prevention process. Thus, when the second opening flag F2 is ON, the request output unit 13 outputs the ABV opening request.

When the decrease speed DGAE is less than or equal to the determination speed DGAEth in the process of step S201 (S201: NO), the open-closed determination unit 12 ends the present processing routine.

Further, when the throttle is not closed in the process of S202 (S202: NO), the open-closed determination unit 12 ends the present processing routine.

In addition, when the prediction flow rate GAE is greater than the determination flow rate GAEth in the process of step S203 (S203: NO), the open-closed determination unit 12 ends the present processing routine.

When the pressure ratio PR is greater than the determination pressure ratio PRth in the process of step S204 (S204: NO), the open-closed determination unit 12 ends the present processing routine.

The alternating backflow prevention process corresponds to a first process that determines that a first valve opening condition is satisfied when the decrease speed of the target throttle passage amount is greater than a specified determination speed. Since the prediction flow rate GAE is obtained using the target throttle passage amount GAT, the first valve opening condition includes a condition in which the decrease speed DGAE of the prediction flow rate GAE is greater than the determination speed DGAEth. The prediction flow rate GAE being less than or equal to the determination flow rate GAEth corresponds to the target throttle passage amount being less than or equal to a specified determination threshold value.

Figure 5:
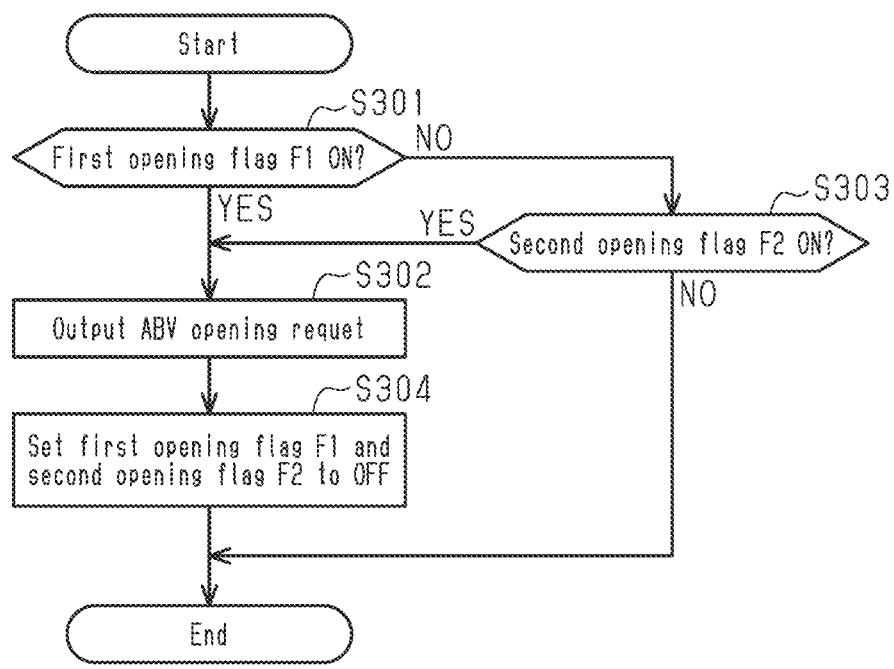
FIG. 5 is a flowchart illustrating the flow of a process related to the control of the air bypass valve executed by the controller.

The processing routine executed by the request output unit 13 will now be described with reference to FIG. 5. The present processing routine is repeatedly executed in predetermined cycles.

When the present processing routine is executed, the request output unit 13 first determines in step S301 whether the first opening flag F1 is ON. When the first opening flag F1 is ON (S301: YES), the request output unit 13 advances the process to step S302.

In step S302, the request output unit 13 outputs the ABV opening request. This causes the ABV control unit 11 to open the first and second ABVs 34, 54. After outputting the ABV opening request, the request output unit 13 advances the process to step S304.

In step S304, the request output unit 13 sets the first opening flag F1 and the second opening flag F2 to OFF. Then, the request output unit 13 ends the present processing routine.

When the first opening flag F1 is OFF in the process of step S301 (S301: NO), the request output unit 13 advances the process to step S303. In step S303, the request output unit 13 determines whether the second opening flag F2 is ON. When the second opening flag F2 is OFF (S303: NO), the request output unit 13 ends the present processing routine.

When the second opening flag F2 is ON in the process of step S303 (S303: YES), the request output unit 13 advances the process to step S302. That is, the request output unit 13 outputs the ABV opening request so that the ABV control unit 11 opens the first and second ABVs 34, 54. After outputting the ABV opening request, the request output unit 13 advances the process to step S304. The request output unit 13 sets the first opening flag F1 and the second opening flag F2 to OFF and then ends the present processing routine.

The request output unit 13 stops the output of the ABV opening request after a specified period has elapsed since the ABV opening request was output. The specified period simply needs to be, for example, a period until the rotation speeds of the first compressor 41 and the second compressor 61 decrease to such an extent that surging and alternating backflow do not occur. Alternatively, the specified period may be a period until the pressure ratio PR becomes small or a period until the prediction flow rate GAE decreases.

More specifically, when at least one of the first opening flag F1 and the second opening flag F2 is ON, the request output unit 13 outputs the ABV opening request. Further, when at least one of the first opening flag F1 and the second opening flag F2 is ON, the ABV control unit 11 opens the first and second ABVs 34, 54. The ABV control unit 11 opens the first and second ABVs 34, 54 when at least one of the first valve opening condition and the second valve opening condition is satisfied.

The operation of the present embodiment will now be described.

The controller 10 is capable of opening the first and second ABVs 34, 54 through the surging prevention process when surging easily occurs. Further, the controller 10 executes the alternating backflow prevention process as a process that opens the first and second ABVs 34, 54.

The alternating backflow that occurs in the internal combustion engine 20 will now be described with reference to FIGS. 6A and 6B. As shown in FIG. 6A, the throttle valve 23 starts to close at the point in time t1 and the throttle opening degree TA becomes small after the point in time t1.

In the internal combustion engine 20, when the throttle valve 23 is closed, the intake air that has passed through the first compressor 41 and the second compressor 61 has no place to flow to. Thus, for example, when the rotation speed of the first compressor 41 is higher than the rotation speed of the second compressor 61, the intake air flowing from the first compressor 41 into the merge portion 21A flows beyond the merge portion 21A back into the second intake passage 51. The first compressor 41, which is on the upstream side of the backward flow, pushes intake air toward the second compressor 61, which is on the downstream side, so that the first compressor 41 has a lower rotation speed than the second compressor 61. When the decrease in the rotation speed of the first compressor 41 causes the compressor with the highest rotation speed switches between the first compressor 41 and the second compressor 61 so that the rotation speed of the second compressor 61 becomes higher than the rotation speed of the first compressor 41, the backflow direction of the intake air reverses. The backflow of the intake air reverses repeatedly until the rotation speeds of the first compressor 41 and the second compressor 61 decrease as the backflow of the intake air becomes weak.

As shown in FIG. 6B, when alternating backflow occurs, the first intake air amount Ga1 and the second intake air amount Ga2 increase and fall below 0 so that they repeatedly increase and decrease despite a decreased throttle opening degree TA after the point in time t1. Such increase and decrease in the first intake air amount Ga1 and the second intake air amount Ga2 result from the fluctuation of the detection values of the first air flow meter 81 and the second air flow meter 82 that is caused by the alternating backflow. In the increase and decrease in the first intake air amount Ga1 and the second intake air amount Ga2, an increase or decrease does not occur in the amount of air that is actually drawn into each cylinder of the internal combustion engine 20. Accordingly, if the requested value of the fuel injection amount is obtained using the first intake air amount Ga1 and the second intake air amount Ga2 that are deviated from the actual intake air amount during the occurrence of the alternating backflow, the fuel injection amount becomes excessive or insufficient. When the fuel injection amount becomes excessive or insufficient, the air-fuel ratio of exhaust gas fluctuates. Thus, when the alternating backflow occurs, the first exhaust gas air-fuel ratio Af1 and the second exhaust gas air-fuel ratio Af2 may also repeatedly increase and decrease.

Such an alternating backflow occurs in a region with a small pressure ratio and/or a region with a small amount of air passing through the throttle valve, not when the stream of the intake air that would cause surging is strong. The controller 10 is capable of opening the first and second ABVs 34, 54 through the alternating backflow prevention process when alternating backflow easily occurs.

The running condition of the internal combustion engine 20 when the alternating backflow prevention process is executed will now be described with reference to FIGS. 7A to 7E.

As shown in FIG. 7A, the throttle valve 23 starts to close at the point in time t11 and the throttle opening degree TA becomes small after the point in time t11.

As shown in FIG. 7B, when the throttle valve 23 starts to close at the point in time t11, the prediction flow rate GAE starts to decrease after the point in time t11. While the decrease speed DGAE is great at the point in time where the prediction flow rate GAE starts to decrease, the decrease speed DGAE becomes gradually small as time elapses. At the point in time t12, the decrease speed DGAE is greater than the determination speed DGAEth (S201: YES) and the prediction flow rate GAE is less than or equal to the determination flow rate GAEth (S203: YES).

As shown in FIG. 7C, the intake manifold pressure Pi becomes less than the internal pressure Pa after the point in time t11. At the point in time t12, the intake manifold pressure Pi is less than the determination manifold pressure Pith and the throttle valve 23 is determined as being closed (S202: YES).

The boost pressure Pc also decreases after the point in time t11. The internal pressure Pa, which is the pressure in the portions upstream of the compressors, remains unchanged before the point in time t11 and after the point in time t11. The boost pressure Pc converges to the internal pressure Pa as time elapses. That is, after the point in time t11, the pressure ratio PR becomes close to 1.0 as time elapses. At the point in time t12, the pressure ratio PR is less than or equal to the determination pressure ratio PRth (S204: YES).

In the alternating backflow prevention process, after the throttle valve 23 starts to close at the point in time t1l, the second opening flag F2 is set to ON at the point in time t12 (S205). Consequently, as shown in FIG. 7E, the request output unit 13 outputs the ABV opening request (S302) so that the ABV control unit 11 opens the first and second ABVs 34, 54.

At the point in time t12, when the second opening flag F2 is set to ON to open the first and second ABVs 34, 54, the intake air that has had no place to flow to due to the closing of the throttle valve 23 passes through the first bypass 33 and the second bypass 53. That is, when the first and second ABVs 34, 54 open, the intake air that has passed through the first compressor 41 and the second compressor 61 is released through the first bypass 33 and the second bypass 53. Thus, the first intake air amount Ga1 and the second intake air amount Ga2 decrease as shown in FIG. 7D, instead of increasing and decreasing as illustrated in FIG. 6B.

The ABV opening request that is output at the point in time t12 stops to be output after the specified period elapses from the point in time t12. When the output of the ABV opening request is stopped, the ABV control unit 11 closes the first and second ABVs 34, 54.

The advantages of the embodiment will now be described.

(1) Opening the first and second ABVs 34, 54 allows intake air to be released through the first bypass 33 and the second bypass 53. This prevents the occurrence of alternating backflow, which occurs because the intake air that has had no place to flow to due to the closing of the throttle valve 23 flows from the compressor with a higher rotation speed to the compressor with a lower rotation speed.

(2) The controller 10 opens the first and second ABVs 34, 54 when the decrease speed DGAE is greater than the determination speed DGAEth. That is, the controller 10 predicts that the throttle valve 23 will be closed and causes the first and second ABVs 34, 54 to be closed. This allows the first and second ABVs 34, 54 to be opened before the throttle valve 23 is completely closed to cause backward flow, which triggers the alternating backflow.

(3) Opening the first and second ABVs 34, 54 as a result of executing the alternating backflow prevention process is limited to when the running condition of the internal combustion engine 20 is out of the surging prevention region. This prevents the surging prevention process and the alternating backflow prevention process from interfering with each other and allows the first and second ABVs 34, 54 to be opened when the first and second ABVs 34, 54 need to be opened in each of the processes.

(4) When the pressure ratio PR is small, surging does not occur easily and alternating backflow occurs easily. Setting the second opening flag F2 to ON when the decrease speed DGAE is great and the pressure ratio PR is small allows the first and second ABVs 34, 54 to be opened in a case where the alternating backflow is predicted to occur. In this manner, the first and second ABVs 34, 54 are opened in the alternating backflow prevention process only when the pressure ratio PR is small. Thus, the running condition of the internal combustion engine 20 in which the first and second ABVs 34, 54 are opened is limited more accurately to a running condition in which the alternating backflow occurs. This prevents the first and second ABVs 34, 54 from being unnecessarily opened by the alternating backflow prevention process.

(5) Even if the value of the pressure ratio PR is in a range smaller than the opening request line L1, the first and second ABVs 34, 54 can be opened by the alternating backflow prevention process. That is, even in a running condition in which the first and second ABVs 34, 54 cannot be opened by the surging prevention process, the first and second ABVs 34, 54 can be opened. This prevents the alternating backflow from occurring.

(6) The intake manifold pressure Pi is used to determine the open-closed state of the throttle valve 23. This increases the accuracy of determining whether the alternating backflow is predicted to occur. That is, by further limiting the running condition in which the first and second ABVs 34, 54 are opened, the alternating backflow prevention process prevents the first and second ABVs 34, 54 from being unnecessarily opened.

(7) When the prediction flow rate GAE is great, even if the decrease speed DGAE of the prediction flow rate GAE is high, enough time to completely close the throttle valve 23 may be given. That is, it is predicted that alternating backflow does not immediately occur when the prediction flow rate GAE is great. Thus, the controller 10 is capable of setting the second opening flag F2 to ON only when the prediction flow rate GAE is small and is thus capable of increasing the accuracy of determining whether the alternating backflow is predicted to occur. By further limiting the running condition in which the air bypass valves are opened, the alternating backflow prevention process prevents the first and second ABVs 34, 54 from being unnecessarily opened.

The present embodiment may be modified as follows. The above-described embodiments and the following modifications can be combined as long as the combined modifications remain technically consistent with each other.

In the above-described embodiment, the first prediction flow rate is used as the prediction flow rate GAE. Instead, the second prediction flow rate may be used as the prediction flow rate GAE.

The alternating backflow prevention process executed using the first prediction flow rate as the prediction flow rate GAE and the alternating backflow prevention process executed using the second prediction flow rate as the prediction flow rate GAE may be executed. In this case, when the ABV opening request is output by one of these processes, the ABV control unit 11 causes the first and second ABVs 34, 54 to be opened.

In the above-described embodiment, the open-closed determination unit 12 uses the prediction flow rate GAE to make a determination in the alternating backflow prevention process. Instead of the prediction flow rate GAE, the open-closed determination unit 12 may use the target throttle passage amount GAT, which is used to obtain the prediction flow rate GAE, to make a determination.

The determination pressure ratio PRth simply needs to be set as the value of the pressure ratio PR in the range smaller than the opening request line L1 shown in FIG. 3. Instead, for example, the determination pressure ratio PRth may be set to a value close to 1.0, such as a value between 1.0 and 1.1.

The period in which the output of the ABV opening request is stopped does not have to be after the specified period has elapsed since the ABV opening request was output. Instead, for example, when the running condition of the internal combustion engine 20 becomes out of the surging prevention region, the output of the ABV opening request may be stopped. Alternatively, for example, when a threshold value less than the determination speed DGAEth is set as an opening end determination speed and the decrease speed DGAE of the prediction flow rate GAE becomes less than or equal to the opening end determination speed, the output of the ABV opening request may be stopped.

In the above-described embodiment, the throttle state determination unit 16 determines the open-closed state of the throttle valve 23 using the intake manifold pressure Pi. Instead, the throttle state determination unit 16 may determine the open-closed state of the throttle valve 23 by detecting the opening degree of the throttle valve 23 with a sensor.

Figure 4:
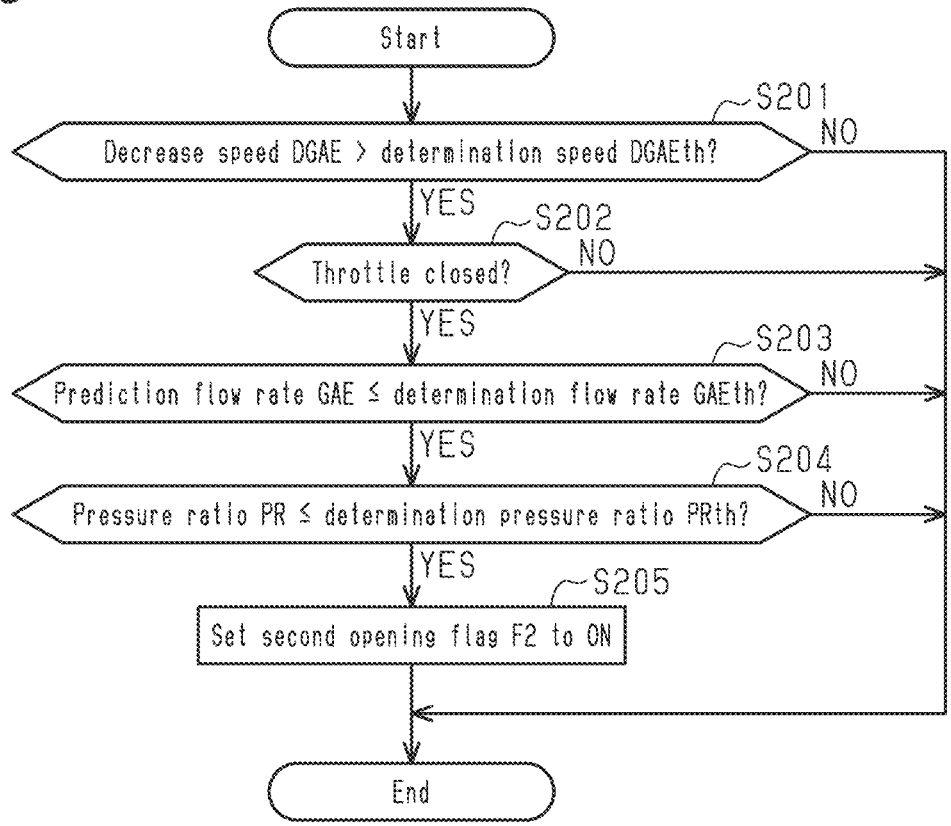
FIG. 4 is a flowchart illustrating the flow of another process related to the control of the air bypass valve executed by the open-closed determination unit of the controller.

In the processing routine of FIG. 4 in the above-described embodiment, one or more of steps S202 to S204 may be omitted. The first and second ABVs 34, 54 simply need to be opened when the decrease speed DGAE is greater than the determination speed DGAEth as a result of the determination in step S201.

In the above-described embodiment, the open-closed determination unit 12 executes the process of preventing surging in addition to alternating backflow. However, the surging prevention process illustrated in FIG. 2 does not have to be executed.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A controller for an internal combustion engine, the internal combustion engine including:
    a first forced induction device including a first compressor arranged on a first intake passage;
    a second forced induction device including a second compressor arranged on a second intake passage;
    a merge portion where intake air that has passed through the first compressor in the first intake passage merges with intake air that has passed through the second compressor in the second intake passage;
    an intake manifold through which intake air is drawn into a cylinder in the first and second intake passages;
    a merged intake air passage connecting the merge portion and the intake manifold in the first and second intake passages;
    a throttle valve arranged on the merged intake air passage;
    a first bypass connecting a portion upstream of the first compressor in the first intake passage and a portion downstream of the first compressor in the first intake passage;
    a second bypass connecting a portion upstream of the second compressor in the second intake passage and a portion downstream of the second compressor in the second intake passage;
    a first air bypass valve arranged on the first bypass; and
    a second air bypass valve arranged on the second bypass, the controller comprising:
    an intake air amount obtaining unit configured to obtain, using a target torque of the internal combustion engine, a target throttle passage amount as a target value of an amount of intake air drawn through the throttle valve;
    an open-closed determination unit configured to determine whether a valve opening condition for the first and second air bypass valves is satisfied; and
    an air bypass valve control unit configured to open the first and second air bypass valves when the valve opening condition is satisfied,
        wherein the open-closed determination unit is configured to determine that the valve opening condition is satisfied when a decrease speed of the target throttle passage amount is greater than a specified determination speed.

2. The controller according to claim 1, further comprising a pressure ratio obtaining unit configured to obtain a ratio of a boost pressure to an internal pressure as a pressure ratio, the internal pressure being a pressure in a portion upstream of the first compressor or a portion upstream of the second compressor in the first intake passage, the boost pressure being a pressure in a portion between the first compressor and the throttle valve in the first intake passage and a pressure in a portion between the second compressor and the throttle valve in the second intake passage, wherein
    the open-closed determination unit is configured to execute:
        a first process that determines whether the valve opening condition is satisfied; and
        a second process that determines, with the valve opening condition referred to as a first valve opening condition, whether a second valve opening condition for the first and second air bypass valves is satisfied,
    the open-closed determination unit is configured to determine, in the second process, that the second valve opening condition is satisfied when occurrence of surging is predicted from a relationship between the pressure ratio and the target throttle passage amount, the air bypass valve control unit is configured to open the first and second air bypass valves when at least one of the first valve opening condition or the second valve opening condition is satisfied, and the open-closed determination unit is configured to determine that the first valve opening condition is satisfied on condition that the pressure ratio is less than or equal to a specified determination pressure ratio.

3. The controller according to claim 2, further comprising a throttle state determination unit configured to determine an open-closed state of the throttle valve, wherein the open-closed determination unit is configured to determine, in the first process, that the first valve opening condition is satisfied on condition that the throttle valve is determined as being closed.

4. The controller according to claim 3, wherein the throttle state determination unit is configured to determine that the throttle valve is closed when a pressure in the intake manifold is less than a specified determination pressure.

5. The controller according to claim 2, wherein the open-closed determination unit is configured to determine, in the first process, that the first valve opening condition is satisfied on condition that the target throttle passage amount is less than or equal to a specified determination threshold value.

6. A control method for an internal combustion engine, the internal combustion engine including:
- a first forced induction device including a first compressor arranged on a first intake passage;
- a second forced induction device including a second compressor arranged on a second intake passage;
- a merge portion where intake air that has passed through the first compressor in the first intake passage merges with intake air that has passed through the second compressor in the second intake passage;
- an intake manifold through which intake air is drawn into a cylinder in the first and second intake passages;
- a merged intake air passage connecting the merge portion and the intake manifold in the first and second intake passages;
- a throttle valve arranged on the merged intake air passage;
- a first bypass connecting a portion upstream of the first compressor in the first intake passage and a portion downstream of the first compressor in the first intake passage;
- a second bypass connecting a portion upstream of the second compressor in the second intake passage and a portion downstream of the second compressor in the second intake passage;
- a first air bypass valve arranged on the first bypass; and
- a second air bypass valve arranged on the second bypass, the method comprising:

- obtaining, using a target torque of the internal combustion engine, a target throttle passage amount as a target value of an amount of intake air drawn through the throttle valve;
- determining whether a valve opening condition for the first and second air bypass valves is satisfied;
- opening the first and second air bypass valves when the valve opening condition is satisfied; and
- determining that the valve opening condition is satisfied when a decrease speed of the target throttle passage amount is greater than a specified determination speed.

7. A controller for an internal combustion engine, the internal combustion engine including:
- a first forced induction device including a first compressor arranged on a first intake passage;
- a second forced induction device including a second compressor arranged on a second intake passage;
- a merge portion where intake air that has passed through the first compressor in the first intake passage merges with intake air that has passed through the second compressor in the second intake passage;
- an intake manifold through which intake air is drawn into a cylinder in the first and second intake passages;
- a merged intake air passage connecting the merge portion and the intake manifold in the first and second intake passages;
- a throttle valve arranged on the merged intake air passage;
- a first bypass connecting a portion upstream of the first compressor in the first intake passage and a portion downstream of the first compressor in the first intake passage;
- a second bypass connecting a portion upstream of the second compressor in the second intake passage and a portion downstream of the second compressor in the second intake passage;
- a first air bypass valve arranged on the first bypass;
- a second air bypass valve arranged on the second bypass; and
- a processor;

the processor is configured to:
- obtain, using a target torque of the internal combustion engine, a target throttle passage amount as a target value of an amount of intake air drawn through the throttle valve;
- determine whether a valve opening condition for the first and second air bypass valves is satisfied;
- open the first and second air bypass valves when the valve opening condition is satisfied; and
- determine that the valve opening condition is satisfied when a decrease speed of the target throttle passage amount is greater than a specified determination speed.

* * * * *